(12) United States Patent
Biancotto et al.

(10) Patent No.: US 9,490,930 B2
(45) Date of Patent: Nov. 8, 2016

(54) OPTICAL COMMUNICATION SYSTEM AND METHOD

(75) Inventors: Alessandro Bianciotto, Munich (DE); Juraj Slovak, Munich (DE); Dirk Van Den Borne, Munich (DE); Dirk-Daniel Gross, Berlin (DE)

(73) Assignees: XIEON NETWORKS S.A.R.L., Luxembourg (LU); FRAUNHOFER GESELLSCHAFT ZUR FORDERUNG DER ANGEWANDTEN FORSCHUNG E.V., Munich (DE)

( * ) Notice: Subject to any disclaimer, the term of this patent is extended or adjusted under 35 U.S.C. 154(b) by 138 days.

(21) Appl. No.: 13/990,371

(22) PCT Filed: Nov. 28, 2011

(86) PCT No.: PCT/EP2011/071110
§ 371 (c)(1),
(2), (4) Date: Sep. 12, 2013

(87) PCT Pub. No.: WO2013/072534
PCT Pub. Date: Jun. 7, 2012

(65) Prior Publication Data
US 2013/0343766 A1    Dec. 26, 2013

(30) Foreign Application Priority Data
Nov. 29, 2010   (EP) .................................. 10192953

(51) Int. Cl.
*H04B 10/00* (2013.01)
*H04J 14/06* (2006.01)
(Continued)

(52) U.S. Cl.
CPC .......... *H04J 14/06* (2013.01); *H04B 10/2543* (2013.01); *H04B 10/2569* (2013.01); *H04B 10/2916* (2013.01); *H04B 10/532* (2013.01); *H04J 14/02* (2013.01)

(58) Field of Classification Search
USPC .................................................. 398/173–181
See application file for complete search history.

(56) References Cited

U.S. PATENT DOCUMENTS 5,104,222 A *  4/1992  Kersey ............... G01D 5/35303
                                                         356/477
5,345,331 A *  9/1994  Bergano ............. H04B 10/2569
                                                         359/337

(Continued)

FOREIGN PATENT DOCUMENTS

EP       1315321 A1     5/2003
WO    2012/072534 A1     6/2012

OTHER PUBLICATIONS

Karlsson, Magnus et al., "Effects of Nonlinearities on PMD-Induced System Impairments," Journal of Lighwave Technology, vol. 24(11):4127-4137 (2006).

(Continued)

*Primary Examiner* — Agustin Bello
(74) *Attorney, Agent, or Firm* — Nelson Mullins Riley & Scarborough LLP (57) ABSTRACT

A method for an optical communication system and an optical communication system comprising a pump source configured to generate a pump signal having rotating polarization, a polarization sensitive receiver for receiving the optical signal having a polarization tracking cut-off frequency, wherein the polarization of the pump signal is configured to rotate at a predetermined frequency of polarization rotation and the frequency of polarization rotation of the pump signal is higher than the polarization tracking cut-off frequency of the receiver. Suitable for mitigation of cross-polarization modulation (XPolM) related effects in coherent polarization multiplexed quadrature phase shift keying (CP-QPSK) systems.

13 Claims, 9 Drawing Sheets

(51) Int. Cl.
*H04B 10/2543* (2013.01)
*H04B 10/2569* (2013.01)
*H04B 10/291* (2013.01)
*H04B 10/532* (2013.01)
*H04J 14/02* (2006.01)

(56) References Cited

U.S. PATENT DOCUMENTS

| | | | | |
|---|---|---|---|---|
| 5,596,667 | A * | 1/1997 | Watanabe | G02F 1/3538 372/21 |
| 5,798,853 | A * | 8/1998 | Watanabe | H04B 10/2531 359/300 |
| 6,175,435 | B1 * | 1/2001 | Watanabe | H04B 10/255 398/147 |
| 6,342,965 | B1 * | 1/2002 | Kinoshita | H01S 3/06725 359/334 |
| 6,404,542 | B1 * | 6/2002 | Ziari | H01S 3/094003 359/341.3 |
| 6,456,426 | B1 * | 9/2002 | Bolshtyansky | H01S 3/302 359/334 |
| 6,657,776 | B2 * | 12/2003 | Gehlot | H04B 10/2916 359/334 |
| 7,043,099 | B1 * | 5/2006 | Watanabe | G02F 1/3538 385/11 |
| 7,518,711 | B2 * | 4/2009 | Futami | G01J 9/04 356/121 |
| 7,639,945 | B2 * | 12/2009 | Tamura | G02F 1/395 398/152 |
| 7,835,643 | B2 * | 11/2010 | Futami | G01J 11/00 356/73.1 |
| 7,940,454 | B2 * | 5/2011 | Watanabe | G02F 1/395 359/330 |
| 7,978,319 | B2 * | 7/2011 | Okabe | G01R 13/347 356/364 |
| 8,275,264 | B2 * | 9/2012 | Watanabe | H04B 10/299 398/92 |
| 8,488,978 | B2 * | 7/2013 | Watanabe | G02F 1/3515 359/326 |
| 8,676,059 | B2 * | 3/2014 | Watanabe | G02F 2/004 359/330 |
| 2003/0095745 | A1 * | 5/2003 | Gehlot | H01S 3/302 385/31 |
| 2003/0138196 | A1 * | 7/2003 | Kim | H01S 3/06791 385/27 |
| 2005/0220161 | A1 * | 10/2005 | Bolshtyansky | H01S 3/0941 372/69 |
| 2007/0071454 | A1 * | 3/2007 | Liu | H04B 10/505 398/183 |
| 2008/0145052 | A1 | 6/2008 | Hecker et al. | |
| 2009/0103931 | A1 * | 4/2009 | Grigoryan | H04B 10/60 398/202 |
| 2012/0002283 | A1 * | 1/2012 | Xie | H01S 3/302 359/492.01 |
| 2013/0343766 | A1 * | 12/2013 | Bianciotto | H04B 10/2543 398/152 |

OTHER PUBLICATIONS

Mussolin, Marco et al., "DSP-based compensation of non-linear impairments in 100 Gb/s PolMux QPSK," 12th International Conference on Transparent Optical Networks (ICTON), 4 pages (2010).
Renaudier, Jeremie et al., "Investigation on WDM Nonlinear Impairments Arising From the Insertion of 100-Gb/s Coherent PDM-QPSK Over Legacy Optical Networks," IEEE Photonics Technology Letters, vol. 21(24):1816-1818 (2009).
Van Den Borne, D. et al., "Reduction of Nonlinear Penalties Through Polarization Interleaving in 2 x 10 Gb/s Polarization-Multiplexed Transmission," IEEE Photonics Technology Letters, vol. 17(6):1337-1339 (2005).
European Search Report for Application No. 10192953.7, 8 pages, dated May 9, 2011.
International Search Report and Written Opinion for Application No. PCT/EP2011/071110, 13 pages, dated Dec. 28, 2011.

* cited by examiner

OPTICAL COMMUNICATION SYSTEM AND METHOD

RELATED APPLICATIONS

This application is a 35 U.S.C. §371 filing of International Application Number PCT/EP2011/071110 which was filed on Nov. 28, 2011, and which claims priority to, and the benefit of, EP patent application number 10 192 953.7, filed on Nov. 29, 2010. The contents of the aforementioned applications are hereby incorporated herein by reference.

FIELD OF THE INVENTION

The invention refers to a system and a method for signal processing in a communication system (e.g. an optical communication system).

BACKGROUND OF THE INVENTION

Driven by growing demand on transmission capacities, sophisticated modulation formats with improved spectral efficiency are becoming the established technology-of-choice for commercial usage in optical communication systems.

Relatively robust and price effective on-off keying, widely applied for data rates of up to 10 Gbit/s, is step by step replaced by transmission formats modulated in phase and polarization, enabling further increase of data rates to 40 Gbit/s, 100 Gbit/s and higher.

Hereto, combination of polarization multiplexing and coherent signal detection, namely "coherently-detected polarization multiplexed quadrature phase shift keying" (CP-QPSK), has been identified as a modulation format of choice for next generation high capacity transmission.

The main CP-QPSK drivers are that it doubles the spectral efficiency and the total capacity, it is part of the 100 G standardization according to the Optical Internetworking Forum (OIF), and all major system houses and component suppliers are currently working on CP-QPSK solutions.

On system level, it is of interest to reuse already implemented concepts when introducing new modulation formats.

This applies also for optical pump sources that are currently used in context with different applications.

As an example of applications for optical pump sources it is worthwhile to mention high power pump lasers for Raman amplifiers, which enable a further increase of span length or idler channels which guarantee optimum EDFA operation in Dense Wavelength Division Multiplexing (DWDM) systems with limited total channel count as well as link stabilization in submarine transmission systems, or dynamically controlled Continuous Wave (CW) channels, which allow for network stabilization in case of sudden power transients (e.g. due to fiber cut).

In all of the aforementioned applications, the power level of the pump signal is usually higher than the average power level of the in-service data signals. In order to prevent polarization dependent gain ripple or signal distortions due to FWM interactions or polarization-dependent Raman gain, an unpolarized CW light or a filtered ASE source is conventionally employed.

All these techniques are well known in the art and used in current Dense Wavelength Division Multiplexing (DWDM) systems with conventional modulation formats as, for example, On Off Keying (OOK), Optical Duo Binary (ODB), Differential Phase Shift Keying (DPSK) or Differential Quadrature Phase Shift Keying (DQPSK).

However, much more than other modulation formats, modulation formats based on polarization multiplexing are sensitive to random or deterministic polarization rotations induced by cross-polarization modulation (XPolM) between the optical signals propagating along a transmission link.

In particular, a critical role is played by the spectral region in which such polarization rotations fall. Accordingly, the following classification can be introduced:

Slow polarization rotations, whose spectral components fall within the adaptive compensation speed of the receiver (<100 kHz). These rotations are typically caused by mechanical and thermal stress effects cumulating during fiber propagation and the receiver is designed to fully compensate for them.

Fast polarization rotations, whose spectral components exceed the adaptive compensation speed of the receiver but fall within its electrical bandwidth (between 100 kHz and the polarization tracking cut-off frequency). These polarization rotations result from XPolM effects cumulating during fiber propagation and the adaptive algorithms within the receiver are not fast enough to compensate for them.

Ultra-fast polarization rotations, whose spectral components fall outside the electrical bandwidth of the receiver (above the polarization tracking cut-off frequency). These polarization rotations also result from XPolM effects cumulating during fiber propagation, but they are so fast that they are rejected by the electrical filter of the receiver and therefore must not be compensated for by the adaptive algorithms of the receiver itself.

Figure 1:
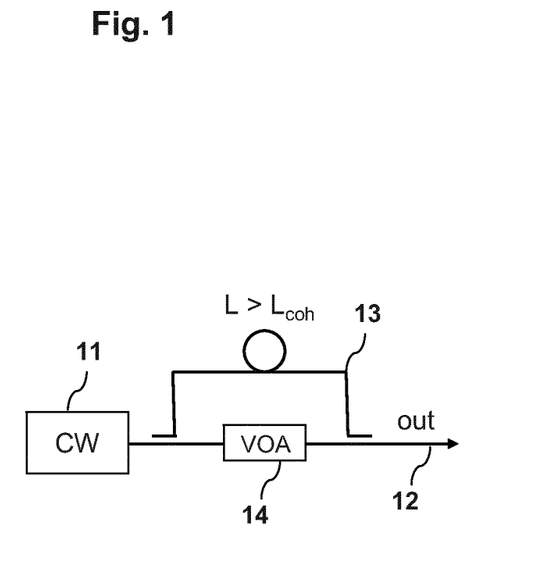
FIG. 1 is a schematic representation of the application of a conventional depolarization technique.

FIG. 1 is a schematic representation of the application of a conventional depolarization technique. In particular, FIG. 1 shows a combination of two delayed fractions of a single CW light 11, the first fraction over a Variable Optical Attenuator 14 and the second fraction over an optical fiber 13 characterized by a fiber length L>$L_{coh}$, where $L_{coh}$ is the coherence length.

Figure 2:
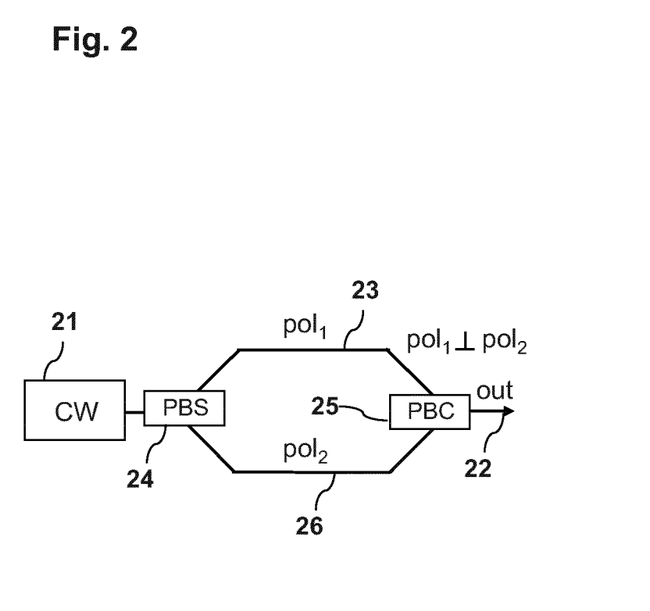
FIG. 2 is a schematic representation of the application of a conventional depolarization technique.

FIG. 2 is a schematic representation of the application of a conventional depolarization technique. In particular, FIG. 2 shows the combination 22 of two orthogonally polarized CW signals 23 and 26 from a single laser source 21. It shows also the Polarization Beam Splitter PBS 24, which splits the single laser source 21 in two orthogonally polarized CW signals 23 and 26, and a Polarization Beam Combiner PBC 25, which combines the two orthogonally polarized CW signals 23 and 26.

Figure 3:
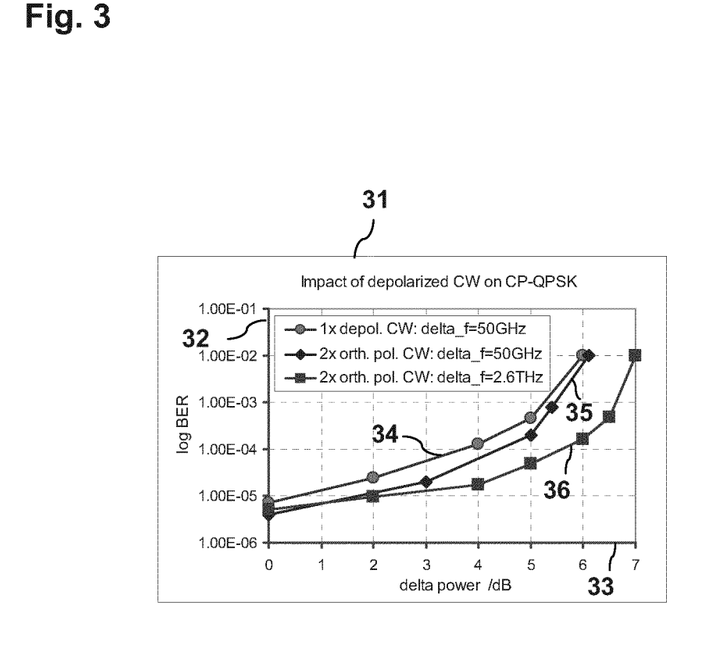
FIG. 3 is a representation 31 of the degradation of the Bit Error Ratio BER 32 of a 40 G CP-QPSK optical signal due to a depolarized CW channel.

FIG. 3 is a representation 31 of the degradation of the Bit Error Ratio BER 32 of a 40 G CP-QPSK optical signal due to a depolarized CW channel. In particular, FIG. 3 shows the Bit Error Ratio BER 32 of a 40 G CP-QPSK optical signal versus the difference between the power of the Continuous Wave CW pump signal and the power of CP-QPSK optical signal for three different cases:

a combination 34 of two delayed fractions of a single CW light, the CW signal being located 50 GHz away from the CP-QPSK optical signal;

a combination 35 of two orthogonally polarized CW signals and from a single laser source, the CW signal being located 50 GHz away from the CP-QPSK optical signal;

a combination 36 of two orthogonally polarized CW signals and from a single laser source, the CW signal being located 2.6 THz away from the CP-QPSK optical signal.

In the example, the CW pump and 40 G CP-QPSK co-propagate over a 700 km fiber link. The CW power level has been continuously increased relatively to the data signal. As shown in FIG. 3, significant bit-error ratio degradations in the CP-QPSK signal can be observed starting at power differences of 1 dB. When the CW signal is a direct neighbor of the CP-QPSK data signal FEC threshold of $10^{-3}$ is violated when exceeding 5 dB pump-data power difference. Furthermore, significant distortions have been detected even when the CW signal is located 2.5 THz away from the CP-QPSK channel.

The example represented in FIG. 3 clearly shows that a conventional depolarized CW signal causes significant penalties for polarization multiplexed data signals over a very wide spectral region, whose width depends on the power of the CW signal itself. For this reason, due to high power difference, similar distortions can be expected also from co-propagating Raman pumps, thus strongly limiting its application in optical transmission systems with polarization-multiplexed channels.

As an alternative, the use of filtered Amplified Spontaneous Emission (ASE) light has been investigated. In contrary to intentionally depolarized CW signals characterized by fast but deterministic polarization rotations, ASE light is completely depolarized, therefore polarization rotations are completely randomized and all polarization states are represented in it with the same probability.

Figure 4:
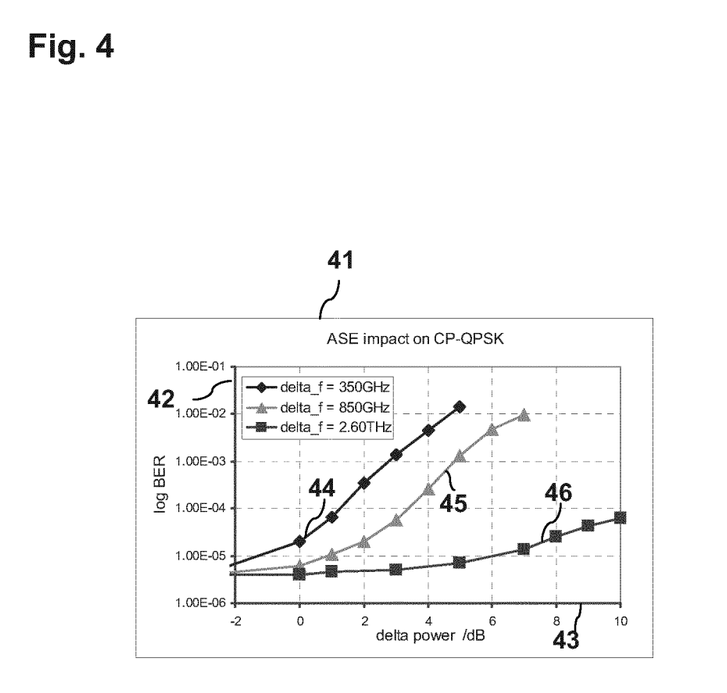
FIG. 4 is a representation 41 of the degradation of the Bit Error Ratio BER 42 of a 40 G CP-QPSK optical signal due to an Amplified Spontaneous Emission (ASE) source.

FIG. 4 is a representation 41 of the degradation of the Bit Error Ratio BER 42 of a 40 G CP-QPSK optical signal due to a Amplified Spontaneous Emission (ASE) source. In particular, FIG. 4 shows the Bit Error Ratio BER 42 of a 40 G CP-QPSK optical signal versus the difference between the power of the Amplified Spontaneous Emission (ASE) source and the power of CP-QPSK optical signal for three different cases:

the Amplified Spontaneous Emission (ASE) source is located 350 GHz away 44 from the CP-QPSK optical signal;
the Amplified Spontaneous Emission (ASE) source is located 850 GHz away 45 from the CP-QPSK optical signal;
the Amplified Spontaneous Emission (ASE) source is located 2.60 THz away 46 from the CP-QPSK optical signal.

For this experiment, a wide-band, Amplified Spontaneous Emission (ASE) source filtered by two cascaded 50 GHz optical band-pass filters has been co-propagated together with a 40 G CP-QPSK signal over a 700 km fiber link, and the bit-error ratio of the data signal has been measured for different delta power values. As shown in FIG. 4, significant bit-error rate degradations of CP-QPSK signal over a large spectral region could be observed when increasing the power of the ASE source. This is due to the fact that the Cross Polarization Modulation (XPolM) induced random polarization rotations cover all of the above-mentioned categories: slow, fast and ultra fast. In this case, the fast polarization rotations were responsible for the observed impairment.

Cross polarization modulation effects are expected to affect not only standard coherent receivers based on digital signal processing, but also direct-detection receivers employing fast polarization controllers for input polarization demultiplexing. Indeed, current active polarization controllers can compensate only relatively slow polarization rotations (in the order of a hundred kHz) but would not be able to cope with fast polarization rotations induced by Cross Polarization Modulation (XPolM).

A large number of idler channels schemes, as well as transient suppression channels schemes based either on polarized/depolarized CW signals or on filtered ASE sources are known from the prior art. Cited, for example, is C. Headley, G. Agraval, "*Raman Amplification in Fiber Optics Communication Systems*" Academic Press, Dec. 30, 2004, or J. Chesnoy, G. Agrawal, I. P. Kaminow, and P. Kelley, "*Undersea Fiber Communication Systems*" Academic Press, October 3.

However, such conventional schemes have a severe impact on next generation transmission systems based on coherently detected polarization-multiplexed optical signals such as CPQPSK.

The problem to be solved is to overcome the disadvantages stated above and in particular to provide a solution that minimize the destructive Cross Polarization Modulation (XPolM) interactions in polarization-multiplexed transmission systems such as CP-QPSK.

SUMMARY OF THE INVENTION

In order to overcome the above-described need in the art, the present invention discloses an optical communication system for transmitting an optical signal, comprising a pump source configured to generate a pump signal having rotating polarization, a polarization sensitive receiver for receiving the optical signal having a polarization tracking cut-off frequency, wherein the polarization of the pump signal is configured to rotate at a predetermined frequency of polarization rotation and the frequency of polarization rotation of the pump signal is higher than the polarization tracking cut-off frequency of the receiver.

The polarization tracking cut-off frequency can be defined as a frequency of polarization variations that leads to factor of two higher BER at the polarization sensitive receiver comparing to case without.

In a next embodiment of the invention the optical signal is a coherently-detected polarization-multiplexed quadrature phase shift keying (CP-QPSK) signal.

It is also an embodiment, that the system further comprises a continuous wave (CW) laser source for generating a continuous wave (CW) laser signal.

In other alternative embodiments of the present invention, the system further comprises a polarization modulator for modulating the continuous wave (CW) laser signal and a radio frequency (RF) source connected with the polarization modulator for generating the polarization rotation of the pump signal.

In a further embodiment, the system further comprises a first polarization rotator for rotating the polarization of the continuous wave (CW) laser signal and thereby generating a first component of the pump signal.

In a next embodiment, the system further comprises an optical phase modulator for phase-modulating the continuous wave (CW) laser signal and a radio frequency (RF) source connected with the phase modulator, the optical phase modulator being configured to generate a second component of the pump signal.

In an alternative embodiment, the pump signal is a combination of the first component and the second component of the pump signal.

It is also an embodiment, that the first component and the second component of the pump signal have a different polarization with respect to each other.

In other alternative embodiments of the present invention, the radio frequency (RF) source is configured to adjust the frequency of polarization rotation of the pump signal.

In a further embodiment, the system further comprises a first continuous wave (CW) laser source for generating a first continuous wave laser signal and a second continuous wave (CW) laser source for generating a second continuous wave (CW) laser signal, the first and the second continuous wave (CW) laser signals being frequency detuned with respect to each other.

In a next embodiment, the system further comprises a second polarization rotator coupled with the second continuous wave (CW) laser source for rotating the polarization of the second continuous wave (CW) laser signal and thereby generating a second laser signal.

In an alternative embodiment, the pump signal is a combination of the first continuous wave (CW) laser signal and the second laser signal, the first continuous wave (CW) laser signal and the second laser signal having a different polarization with respect to each other.

It is also an embodiment, that the frequency of polarization rotation of the pump signal is adjustable by adjusting the frequency detuning of the first and the second continuous wave (CW) laser signals with respect to each other.

In a further embodiment, the apparatus further includes an optical fiber link for propagating the pump signal and the optical signal.

In an alternative embodiment, the polarization sensitive receiver is a coherent receiver.

The problem stated above is also solved by a method for transmitting an optical signal which includes: generating a pump signal having rotating polarization, transmitting the pump signal, transmitting the optical signal, receiving the optical signal by means of a polarization sensitive receiver having a polarization tracking cut-off frequency, rotating the polarization of the pump signal at a predetermined frequency of polarization rotation, the frequency of polarization rotation of the pump signal being higher than the polarization tracking cut-off frequency of the receiver.

The method, the apparatus and the system provided, in particular, bears the following advantages:
a) They minimize the destructive Cross Polarization Modulation (XPolM) interactions in polarization-multiplexed transmission systems such as CP-QPSK.
b) They allow the generic usage of optical pump sources independently on modulation format of data channels.
c) They do not require necessarily the employment of high RF electronics.
d) They are easy to implement.
e) They provide a benefit related to power budget, mechanical footprint as well as cost efficiency.

BRIEF DESCRIPTION OF THE DRAWINGS

The invention is explained by way of example in more detail below with the aid of the attached drawings.

DESCRIPTION OF THE INVENTION

As regards the description of FIGS. 1 to 4, reference is made to the background of the invention.

Illustrative embodiments will now be described with reference to the accompanying drawings to disclose the teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 5:
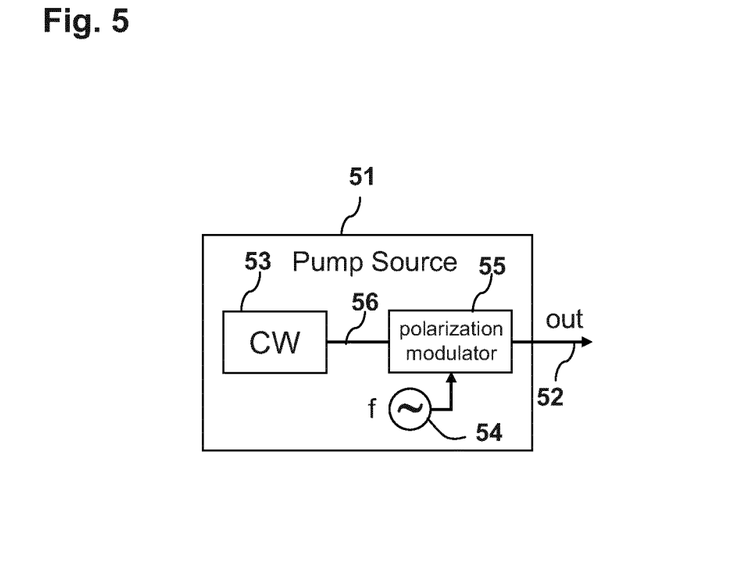
FIG. 5 is a schematic representation of the application of a depolarization technique for application in polarization multiplexed transmission system according to an embodiment of the invention.

FIG. 5 is a schematic representation of the application of a depolarization technique for application in polarization multiplexed transmission system according to an embodiment of the invention. In particular, FIG. 5 shows a pump source 51, for example a Raman pump source, which includes a single CW light source 53, for example a laser source. The CW light source 53 generates a CW laser signal 56 which is modulated by a polarization modulator 55, in particular a fast polarization modulator, that generates the fast polarization rotation of the pump signal 52. The required speed of polarization rotations can be generated using the RF source 54, connected to the polarization modulator 55, which is configured to adjust the frequency of polarization rotation of the pump signal 52. The so generated pump signal 52 can be propagated in a fiber link together with an optical signal, for example a CP-QPSK signal. The optical signal and the pump signal 52 can be received by a polarization sensitive receiver having a given polarization tracking cut-off frequency. The ultra-fast polarization of the pump signal 52 can be adjusted in such a way that the frequency of polarization rotation of the pump signal 52 is higher than the polarization tracking cut-off frequency of the receiver. As a consequence, the spectral components of the polarization rotation can be naturally rejected by the polarization sensitive receiver, which may also be a coherent receiver. The polarization tracking cut-off frequency can be defined as a frequency of polarization variations that leads to factor of two higher BER at the polarization sensitive receiver comparing to case without. In this way the destructive Cross Polarization Modulation (XPolM) interactions in polarization-multiplexed transmission systems can be efficiently minimized.

Figure 6:
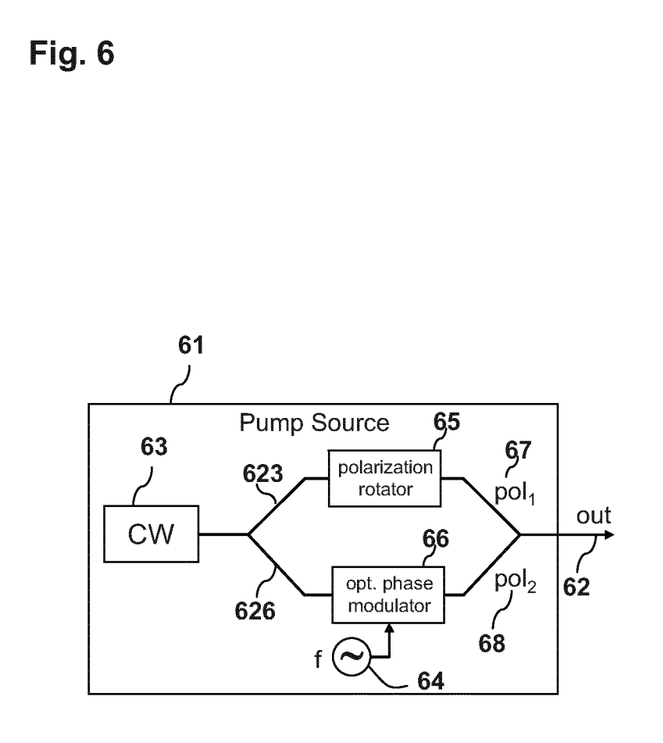

FIG. 6 is a schematic representation of the application of a depolarization technique for application in polarization multiplexed transmission system according to an embodiment of the invention. In particular, FIG. 6 shows a pump source 61, for example a Raman pump source, which generates a pump signal 62, combination of a phase modulated component 68 and a phase un-modulated component 67, having different polarization, derived from a single CW laser source 63. An optical coupler, for example a 3 dB coupler (not shown in FIG. 6) may split the single laser source 63 in two differently polarized CW signals 623 and 626. According to a different embodiment of the invention, the two CW signals 623 and 626 may be orthogonally polarized. An optical phase modulator 66, phase-modulates the CW signals 626, while a polarization rotator 65, rotates the polarization of the CW signal 623 relative to the CW signal 626. An optical coupler, for example a 3 dB coupler (not shown in FIG. 6), may combine the two differently polarized CW signals 67 and 68. The required speed of polarization rotations can be generated using the RF source 64, connected to the optical phase modulator 66, which is configured to adjust the frequency of polarization rotation of the pump signal 62. The so generated pump signal 62 can be propagated in a fiber link together with an optical signal, for example a CP-QPSK signal. The optical signal and the pump signal 62 can be received by a polarization sensitive receiver having a polarization tracking cut-off frequency. The ultra-fast polarization of the pump signal 62 can be adjusted in such a way that the frequency of polarization rotation of the pump signal 62 is higher than the polarization tracking cut-off frequency of the receiver. As a consequence, the spectral components of the polarization rotation can be naturally rejected by the polarization sensitive receiver, which may also be a coherent receiver. In this way the destructive Cross Polarization Modulation (XPolM) interactions in polarization-multiplexed transmission systems can be efficiently minimized.

Figure 7:
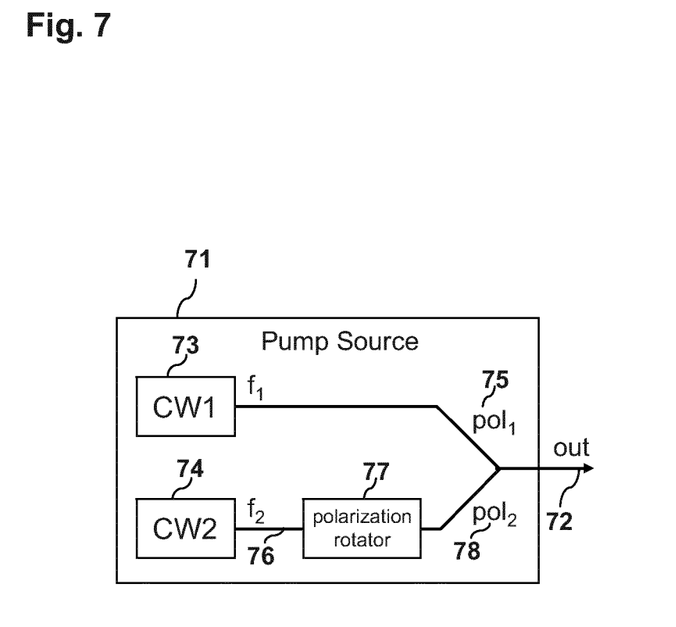
FIG. 7 is a schematic representation of the application of a depolarization technique for application in polarization multiplexed transmission system according to an embodiment of the invention.

FIG. 7 is a schematic representation of the application of a depolarization technique for application in polarization multiplexed transmission system according to an embodiment of the invention. In particular, FIG. 7 shows a pump source 71, for example a Raman pump source, which generates pump signal 72, combination of two frequency detuned, differently polarized CW laser signals 75 and 78 from two CW laser sources 73 and 74. According to a different embodiment of the invention, the two CW signals 75 and 78 may be orthogonally polarized. A polarization rotator 77, coupled with the second continuous wave (CW) laser source 74, which rotates the polarization of the continuous wave (CW) laser signal 76 relative to the CW signal 75 thereby generating the CW signal 78. The fast polarization rotation is generated by combining the two laser signal 78 and 75. The frequency of polarization rotation of the pump signal 72 can be adjustable by adjusting the frequency detuning of the first 75 and the second 76 continuous wave (CW) laser signals with respect to each other. Hereto, speed of polarization rotation is directly related to the frequency detuning of the two CW channels.

The so generated pump signal 72 can be propagated in an fiber link together with an optical signal, for example a CP-QPSK signal. The optical signal and the pump signal 72 can be received by a polarization sensitive receiver having a polarization tracking cut-off frequency. The ultra-fast polarization of the pump signal 72 can be adjusted in such a way that the frequency of polarization rotation of the pump signal 72 is higher than the polarization tracking cut-off frequency of the receiver. As a consequence, the spectral components of the polarization rotation can be naturally rejected by the polarization sensitive receiver, which may also be a coherent receiver. In this way the destructive Cross Polarization Modulation (XPolM) interactions in polarization-multiplexed transmission systems can be efficiently minimized.

The embodiment of the invention comprising the two detuned CW laser signal 75 and 78 does not require necessarily the employment of high RF electronics; furthermore, it provides a benefit related to power budget, mechanical footprint as well as cost efficiency.

Figure 8:
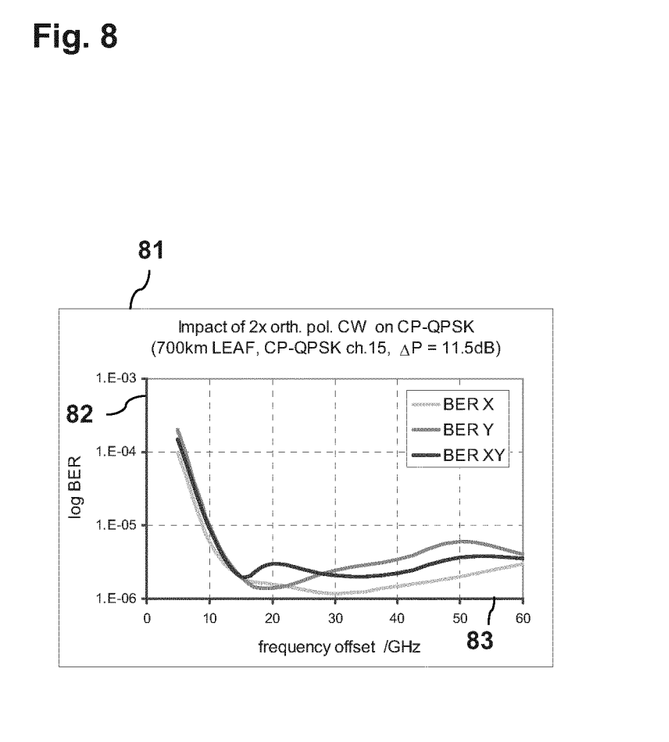
FIG. 8 is a representation 81 of the degradation of the Bit Error Ratio BER 82 of a 40 G CP-QPSK optical signal due to two orthogonally polarized, frequency detuned CW laser sources.

FIG. 8 is a representation 81 of the degradation of the Bit Error Ratio BER 82 of a 40 G CP-QPSK optical signal due to two orthogonally polarized, frequency detuned CW laser sources.

In particular, FIG. 8 shows the Bit Error Ratio BER 82 of a 40 G CP-QPSK optical signal versus the frequency offset 83 between the two orthogonally polarized, frequency detuned CW laser sources.

The 40 G CP-QPSK receiver is characterized by a polarization tracking cut-off frequency of around 8 GHz.

For frequency offset below 10 GHz, significant degradations of data signal can be observed when co-propagating with the pump in a fiber link (optical power variation $\Delta P=11.5$ dB). However once the frequency offset is larger than a critical minimum detuning (in the example shown in FIG. 8 ca. 12 GHz), the distorting influence of the high power pump signal is effectively suppressed.

Figure 9:
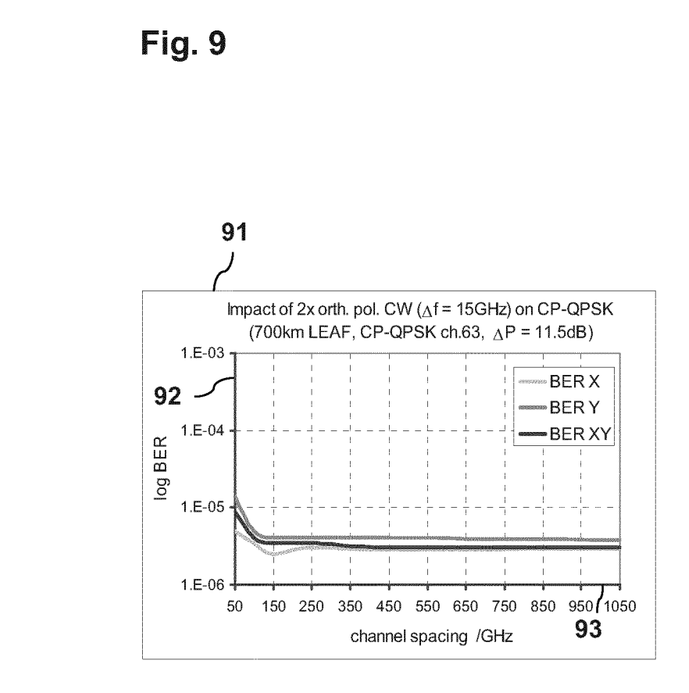
FIG. 9 is a representation 91 of the degradation of the Bit Error Ratio BER 92 of a 40 G CP-QPSK optical signal due to two orthogonally polarized, frequency detuned CW laser sources.

FIG. 9 is a representation 91 of the degradation of the Bit Error Ratio BER 92 of a 40 G CP-QPSK optical signal due to two orthogonally polarized, frequency detuned CW laser sources.

In particular, FIG. 9 shows the Bit Error Ratio BER 92 of a 40 G CP-QPSK optical signal versus the spacing 93 between the CW pump signal and the CP-QPSK signal.

Moreover, FIG. 9 shows that a frequency offset $\Delta f$ of 15 GHz between the two CW signals leads to distortion-free performance almost independently of the spacing between the CW pump and the CP-QPSK channel.

The experimental analysis confirmed that a minimum frequency detuning (polarization rotation speed) is required in order to effectively suppress impairments on polarization multiplexed data signals. Thus, controlled frequency spacing between the two CW lasers may be needed.

The present invention allows for generic usage of optical pump sources independently on modulation format of data channels.

For each modulation format and data rate, a critical minimum frequency detuning has to be identified individually. Theoretically, a fix value for the maximum frequency detuning cannot be established. Larger frequency offset may be beneficial for reducing of pump beating, however this may reduce the optical bandwidth available for useful channels' transmission and may leads to higher sensitivity to frequency dependent polarization changes (due to second order polarization mode dispersion, SOPMD or polarization dependent loss, PDL).

As far as the CW sources are concerned, fixed laser with wavelength locker or a tunable laser can be used. The two CW lights have to be combined at different polarizations (preferably orthogonally polarized). The power level of the lasers should preferably be similar, but slight mismatches do not affect the performance significantly.

The present invention is not limited to the details of the above described principles. The scope of the invention is defined by the appended claims and all changes and modifications as fall within the equivalents of the scope of the claims are therefore to be embraced by the invention. Mathematical conversions or equivalent calculations of the signal values based on the inventive method or the use of analogue signals instead of digital values are also incorporated.

LIST OF ABBREVIATIONS

ASE Amplified Spontaneous Emission
BER Bit Error Ratio
CW Continuous Wave
CP-QPSK Coherent Polarization-multiplexed Quadrature Phase Shift Keying
DPSK Differential Phase Shift Keying
DQPSK Differential Quadrature Phase Shift Keying
DWDM Dense Wavelength Division Multiplexing
EDFA Erbium Doped Fiber Amplifier
FWM Four Wave Mixing
ODB Optical Duo Binary
OIF Optical Internetworking Forum
OOK On Off Keying
OTSC Optical Transient Suppression for C-band
OSA Optical Spectrum Analyzer
PBC Polarization Beam Combiner
PBS Polarization Beam Splitter
PDL Polarization Dependent Loss
SOPMD Second Order Polarization Mode Dispersion
VOA Variable Optical Attenuator
XPolM Cross Polarization Modulation

The invention claimed is:

1. An optical communication system for transmitting a coherently-detected polarization-multiplexed optical data signal, the optical data signal having a transmission format modulated in phase and polarization enabling data rates of 40 Gbit/s and higher, comprising:
   a pump source configured to generate a pump signal for amplifying the optical data signal co-propagating with the pump signal, the pump signal having rotating polarization;
   a polarization sensitive coherent receiver for receiving the polarization-multiplexed optical data signal and for coherently detecting the polarization-multiplexed optical data signal, the receiver having a polarization tracking cut-off frequency;
   an optical fiber link arranged for co-propagating the pump signal together with the optical data signal; and
   the polarization of the pump signal is configured to rotate at a frequency higher than the polarization tracking cut-off frequency of the receiver.

2. A system according to claim 1, the system further comprising a continuous wave laser source for generating a continuous wave laser signal.

3. A system according to claim 2, the system further comprising a polarization modulator for modulating the continuous wave laser signal and a radio frequency source connected with the polarization modulator for generating the polarization rotation of the pump signal.

4. A system according to claim 2, the system further comprising a first polarization rotator for rotating the polarization of the continuous wave laser signal and thereby generating a first component of the pump signal.

5. A system according to claim 4, the system further comprising an optical phase modulator for phase-modulating the continuous wave laser signal and a radio frequency source connected with the phase modulator, the optical phase modulator being configured to generate a second component of the pump signal.

6. A system according to claim 5, the pump signal being a combination of the first component and the second component of the pump signal.

7. A system according to claim 6, the first component and the second component of the pump signal having a different polarization with respect to each other.

8. A system as claimed in claim 3, wherein the radio frequency source is configured to adjust the frequency of polarization rotation of the pump signal.

9. A system according to claim 1, the system further comprising a first continuous wave laser source for generating a first continuous wave laser signal and a second continuous wave laser source for generating a second continuous wave laser signal, the first and the second continuous wave laser signals being frequency detuned with respect to each other.

10. A system according to claim 9, the system further comprising a second polarization rotator coupled with the second continuous wave laser source for rotating the polarization of the second continuous wave laser signal and thereby generating a second laser signal.

11. A system according to claim 10, the pump signal being a combination of the first continuous wave laser signal and the second laser signal, the first continuous wave laser signal and the second laser signal having a different polarization with respect to each other.

12. A system according to claim 9, wherein the frequency of polarization rotation of the pump signal is adjustable by adjusting the frequency detuning of the first and the second continuous wave laser signals with respect to each other.

13. A method for transmitting a coherently-detected polarization-multiplexed optical data signal comprising:
   generating a pump signal having rotating polarization;
   transmitting the polarization-multiplexed optical data signal having a transmission format modulated in phase and polarization enabling data rates of 40 Gbit/s and higher;
   transmitting the pump signal, such that the pump signal is co-propagating together with the polarization-multiplexed optical data signal along an optical fiber link and such that the optical data signal is amplified by the pump signal;
   receiving the polarization-multiplexed optical data signal by means of a polarization sensitive coherent receiver having a polarization tracking cut-off frequency and coherently detecting the polarization-multiplexed optical data signal with the receiver; and
   rotating the polarization of the pump signal at a frequency higher than the polarization tracking cutoff frequency of the receiver.

* * * * *

UNITED STATES PATENT AND TRADEMARK OFFICE
CERTIFICATE OF CORRECTION

PATENT NO. : 9,490,930 B2  Page 1 of 1
APPLICATION NO. : 13/990371
DATED : November 8, 2016
INVENTOR(S) : Alessandro Bianciotto et al.

It is certified that error appears in the above-identified patent and that said Letters Patent is hereby corrected as shown below:

On the Title Page

Item (87), in Column 1, Line 1, delete "WO2013/072534" and insert --WO2012/072534--, therefor.

Signed and Sealed this
Seventh Day of March, 2017

Michelle K. Lee
*Director of the United States Patent and Trademark Office*